Aug. 6, 1946.                W. C. GOSS ET AL                2,405,206
METHOD OF ACTIVATING PRIMARY CARBON

Filed April 29, 1940

INVENTOR
WORTH C. GOSS
O. P. M. GOSS
BY
ATTORNEY

UNITED STATES PATENT OFFICE 2,405,206

METHOD OF ACTIVATING PRIMARY CARBON

Worth C. Goss and Oliver P. M. Goss, Seattle, Wash., assignors to William A. Carlisle, Sr., Seattle, Wash.

Application April 29, 1940, Serial No. 332,280

4 Claims. (Cl. 252—298)

This invention relates to the activation of carbon to increase its capacity for the adsorption of vapors and gases. More particularly the invention has reference to the activation of what has been established in the art, particularly in the patents of Newcomb K. Chaney, as "primary carbon"; the invention dealing particularly with the activation of primary carbon of granular form as prepared for use in various types of purification apparatus, including adsorption towers, gas-masks and the like, but having particular bearing on the production of regulated pore size carbon for the removal of impurities from a liquid, such, for example, as whiskey.

Generally stated, the present invention has to do with the provision of a method of activating granular primary carbon which, due to its method of manufacture or preparation, leaves the granules of different density and consequently requires different lengths of time for activation, depending upon the density of the individual granules; the principal object of the invention being to derive from such granular carbon, the maximum percentage of material capable of being brought within a certain desired range of activation and degree of hardness.

More specifically stated, the present invention resides in a certain procedure or method of activation for obtaining, by a simple and practical means, the greatest possible percentage of material of a specified range of hardness and degree of activity from any charge of granular carbon; the method being based upon a certain procedure which comprises the separation of the granulated product following the initial activating treatment, into a plurality of different classifications, according to granule size; then subsequently individually subjecting the material of uniform size classifications to separation for the segregation of all dense, under-activated granules and their return to the activator for such additional activation as may be necessary to bring them to the desired state of activation.

The invention also resides in the special method for separation of the granules of each size classification for the segregation of those of proper activation from those that are too light or soft and those granules which are too dense and under-activated, and the particular method of returning the under-activated granules to the activator for additional treatment.

Explanatory to the invention, it will here be stated that the present method is intended especially for use in connection with the methods and apparatus for preparing primary carbon which are disclosed in our copending application entitled "Method of manufacturing primary carbon," filed under Serial No. 214,534, now Patent No. 2,304,351, and in a certain application of Worth C. Goss entitled "Improvements in retorts" which is pending under Serial No. 214,535, now Patent No. 2,276,649.

In the manufacture of primary carbon from wood briquettes in accordance with the teachings of the above mentioned pending applications, the briquettes are placed in a retort and are destructively distilled under high temperature and while maintained under considerable mechanical pressure and in the presence and pressure of their distillate gases. After complete distillation, the charred briquettes are cooled and granulated preparatory to activation. However, due to the particular treatment of the briquettes while being converted into primary carbon, there will be a certain percentage of the granular material that is relatively soft; this being the material comprising that which was near the center of the briquettes. Also, there will be a certain percentage of that material coming from near, or at the end surfaces of the briquettes, that is of extreme density. The remaining part of the material, which will be referred to as the material of the intermediate range of density, is quite dense, and it is for this material that conditions in the activator chamber are governed.

The treatment of the granules of any charge of material in its passage through the activator is the same for each, and, as a result, the conditions which are best suited for the material of the intermediate range of density will be insufficient for the extremely dense granules. Therefore, unless these be additionally treated, their full value will not be obtained.

By the present method, we have provided for the separation of the under-activated granules from the other material and their return to the retort for such treatment as may be necessary to bring them to the degree of activation of the bulk of material, and it is in the classification of granules according to size and the separation of the underactivated granules from others in any size classification, and the means for returning them into the retort for additional treatment, that the basis of this application resides.

It will further be explained that in the treatment of primary carbon, made from wood briquettes according to the teachings of the above mentioned pending applications, all material produced by the granulating of the charred briquettes is advanced through an axially rotated, elongated oven or retort, under a temperature of approximately 1800° F. while subjected to steam and flue gas treatment, whereby to bring about the desired activation of the granules. However, in these pending applications, no provision was made for the segregation and additional activation of the under-activated material. The utility of the present method, therefore, resides in the fact that by separating the heavy, under-activated granules and those which are too soft for any specified purpose, from that bulk of material of the intermediate range of density for which conditions in the retort are such as to bring about the required degree of activation and hardness, and subsequently returning the under-activated material to the retort for additional treatment, the percentage of output of material of the desired adsorptive properties and hardness obtained from any given charge of material will be substantially increased.

The present invention features as one of the steps in the method, the classification of granules according to size after the initial activation of a charge and the separation of the underactivated material and the soft material from that of desired hardness, density and activation in each size classification, and the return of the under-activated material to the retort; the separation being by use of an air blast against the stream of material, and the return of material being accomplished by employing the force of a stream of hot gases which are diverted from the retort and returned thereto without admittance of air to the system.

Still further objects of the invention reside in the steps followed, in their sequence and in the specific means employed for carrying out the method.

In accomplishing these and other objects of the invention, we have provided a mechanism which has been disclosed in the present drawing, wherein—

Figure 1:
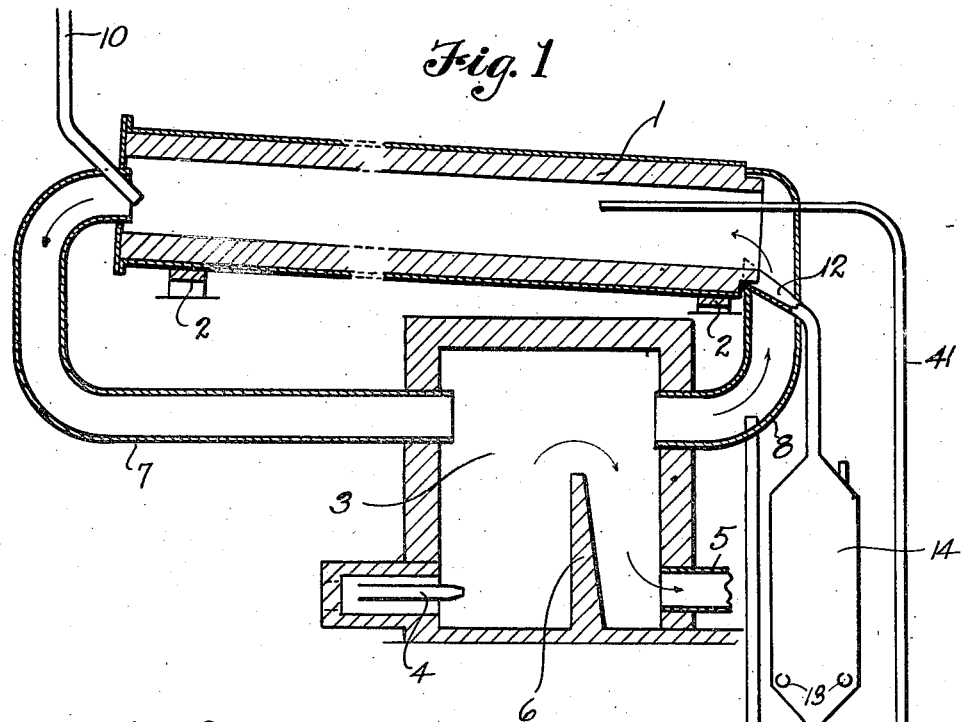
Fig. 1 is a diagrammatic layout of the devices used in the present activation process.

Referring more in detail to the drawing—

1 designates an elongated cylindrical oven or retort, slightly downwardly inclined from its receiving to its discharge end, and supported near its opposite ends by means designated at 2 and 2' for axial rotation.

Below the retort is a furnace 3, heated by an oil burner, or other suitable means, here designated at 4. The furnace has a stack connection 5, and contains a bridge wall 6 at a location between the stack connection and the burner. Gas circulation pipes 7 and 8 extend respectively from opposite ends of the retort to the furnace in such manner as to provide a continuous, closed circuit for circulation of heated gases through the retort. If found desirable or necessary, circulation may be insured by use of a blower fan interposed in the circuit, or by jets using inert gas under pressure.

Figure 2:
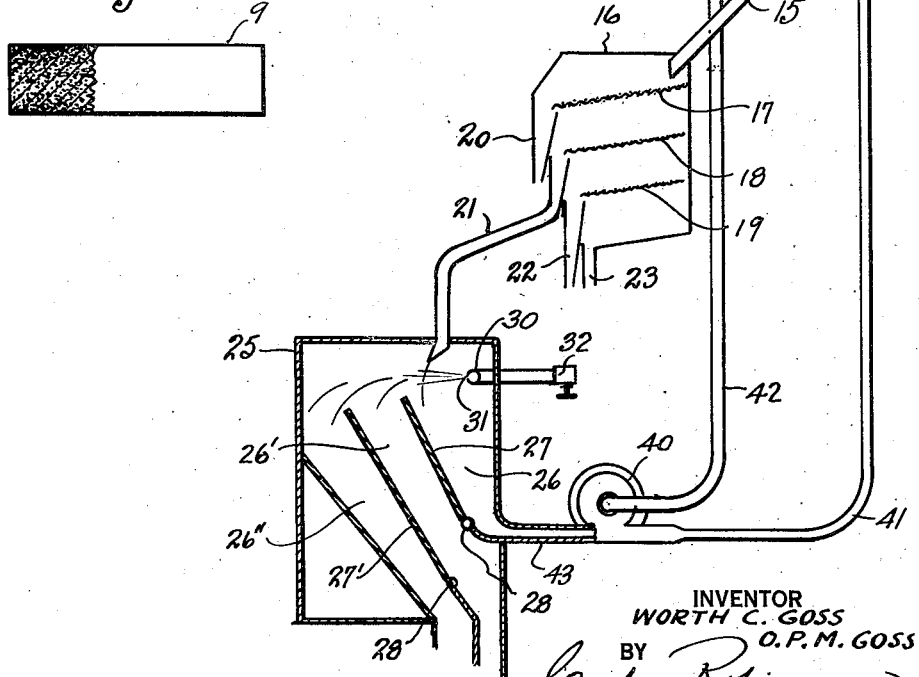
Fig. 2 is a cross section of a briquette of primary carbon as prepared for granulation and indicating the variation in density of material in different parts of the briquette.

Fig. 2 of the drawing is inserted for purpose of illustration and the explanation for the desirability and need for the present method. This figure shows a charred briquette 9, originally of sawdust or woodwaste material, after it has been subjected to destructive distillation in accordance with the teachings of the applications of Worth C. Goss, Serial No. 214,535, now Patent No. 2,276,649, previously referred to. The device, or retort in which the briquette is prepared, as described in the application, is so arranged that the briquette is distilled while held under considerable mechanical pressure applied by steel plates engaging against the opposite ends of the briquette. As a result of the method and devices employed, the charred material in different parts of the briquette will be of different density, as has been indicated by the stippling in the drawing. That part which constitutes approximately the central third of the briquette is of less dense material and, in some cases, may even be of a porous nature. Those parts comprising the opposite end thirds of the briquette are quite dense, with that immediately adjacent the end surface very dense. The material not within the range of density of that which is at the end surfaces, referred to as very dense, and that slightly less dense material from near the center of the briquette, is what will hereinafter be referred to as the material of "intermediate density."

The present method contemplates the activation of granular, primary carbon derived from briquettes of the character above described. The conditions to which this granular carbon is subjected in the initial activation of a charge should, for most practical results, be such that the material of the intermediate range of density will be properly finished in the first run. Under such conditions, however, the very dense material will not be fully activated and must be returned for additional treatment in order to obtain its full value. The light, activated material is separately dealt with after separation from the other granules.

In accordance with the present arrangement of parts, the material to be activated, or, in this case, primary carbon in granular form, as derived from the breaking up of the charred briquettes, is delivered through a feed tube 10 under suitable control, into the higher end of the oven or retort 1 as it revolves. Incident to rotation of the tube, the material will be kept in motion and treated by hot gases while agitated; the heat being approximately 1800° F. The operation is so governed that the treatment for the bulk of material will be completed as the material reaches the discharge end of the oven, where it then falls into an inclined discharge chute 12. From the chute 12, the initially treated material flows into a housing 14 in which suitable means is provided for decreasing the temperature of the material to a degree desirable for the subsequent handling. This cooling may be effected by directing flow or blasts of cold, inert gas delivered from a pipe, or pipes 13, up through the material after it leaves the retort.

From the lower end of the housing 14, the cooled material flows through a discharge pipe 15 to a screen classifier 16 wherein a series of shaker screens are arranged one above the other. These screens are of selected mesh and operate to separate the activated granules, according to granule size, into four or more classifications. In this instance, we have illustrated three screens designated, respectively, at 17, 18 and 19, and have disclosed chutes 20, 21, 22 and 23, as leading from the housing for the conduction of the different size classifications of material to individual air separating units used in connection with the present invention, one of which units is designated at 25. It is anticipated that a separating unit is to be provided for receiving and taking care of each size classification of material, and that all units are like that which has been herein diagrammatically illustrated.

The air separating unit 25 in its present embodiment, comprises a housing divided into a plurality of bins as at 26—26'—26'' by upwardly directed partitions 27 and 27', hinged at their lower edges as at 28, for adjustment, to increase or decrease the distance of their top edge from the air blast pipe.

The granular material, delivered from screen 18, is here shown as being delivered through the chute 21 into the top of the unit 25 and is there permitted to fall in a thin, and preferably wide stream, downwardly toward the bin 26. In order to separate the granules which are too light and soft for any designated use, and those that are too heavy and underactivated, from the bulk of properly activated material, we employ an air blast that is directed laterally against the stream of material as it falls from chute 21. This blast of air is supplied from a horizontal pipe 30, located at one side of the housing 25, above the level of the bins, and equipped at intervals along its length with jet openings, as at 31, from which the air is discharged directly against the material as it falls. It will be understood that the force of air may be regulated by proper control of the supply, as by valve 32, and that the partitions 27 and 27' may be adjusted as required in order that the heavy underactivated material will fall in the first bin 26; the bulk of material of proper kind and weight will fall in the bin 26' and the soft material, due to its lightness, will be carried by the air into bin 26''. It is understood that any number of separations according to weight may be obtained by use of more or less partitions arranged in this way.

In the present operation, the material that is too soft and light is diverted from bin 26'' to storage for a special use. Since the light, porous material may include in the granules, particles or areas that are dense, it is contemplated that this material shall again be ground or otherwise reduced so as to pass a 48–200 screen, and the ground material subjected to air separation, as above described, for segregation of the hard dense particles from those of softer structure. If it is found necessary, these hard particles may be returned for additional activation. This material is adapted for various uses, such, for example, as that disclosed in a pending application of Worth C. Goss, filed January 8, 1940, under Serial No. 312,942, on a method of purifying whiskey by treatment with fine carbon of regulated pore size.

The heavy, underactivated material is now conveyed from the bin 26 back into the activating retort 1 for additional activation, and caused to flow again through the cooler and across the screens of the housing 16 and to the unit 25, and it may be that some of this additionally treated material will thus be returned to the retort several times before being reduced to the proper density and adsorptivity.

The means here provided for the return of this material from the bin 26 comprises a blower fan 40 having a pipe connection 41 leading from its outlet side into the retort and having a pipe connection 42 with its inlet side leading from the interior of the retort or from the circulating pipe system in connection with the furnace. Material delivered from the bin 26 flows through a tube 43 into the pipe 41 and under the driving influence of the moving gas stream propelled by action of the blower 40, will be conveyed through pipe 41 into the retort for additional activation.

The amount of additional activation can be controlled by regulating the extent to which the pipe 41 enters the retort so that the material, on its return into the retort, will have a greater or lesser length to travel before being discharged to tube 12.

It is to be pointed out that by so connecting the blower fan with the furnace, no air is used in the return of the product to the retort, and the desirability for this will be understood by those familiar with the art. It is to be explained further that other units like that above described would be provided to take care of the material from the other screens in the manner indicated as that derived by screen 18, and these would likewise return the underactivated granules back to the retort for additional treatment. All might operate at the same time, or at different times.

In the manner and by the means above described, it is apparent that the percentage of material of any desired density and degree of activation from a charge can be materially increased, as well as the final adsorptive quality of the entire batch of carbon being increased.

The beneficial results hereby attained are due to the fact that the material, after initial activation, is classified according to granule size, which makes possible the air separation of granules according to density. This separation, for the purpose of segregating the underactivated granules, could not be effected so economically by any other method. This makes possible the production of active carbon of a definite final density, or, what is commonly termed "apparent density."

If it is desired to produce extremely fine granular carbon to be used in the purification of liquids, the product as above prepared, and activated to a definite density, may be crushed and screened and again air separated to a specific degree of density. It has been discovered that when this method is employed, the pore size of the fine, liquid purifying carbon is approximately regulated. In the purifying of a liquid which contains various chemical constituents, the approximate control of the pore size is very vital. For example, a large-pore carbon of comparatively low density may be used to remove color from a liquid. If a medium-pore carbon is used, such constituents as gallic acid and aldehydes would be removed from a whiskey being treated, and in this case the color is not diminished because the pores are too small for the large color producing molecules to enter. Thus, the present method of air separation is an inexpensive and simple means of producing the regulated pore size carbon described in the pending application of Worth C. Goss, filed January 8, 1940, under Serial No. 312,942.

Having thus described our invention, what we claim as new therein and desire to secure by Letters Patent is—

1. The method of activating primary carbon comprising progressively advancing a charge of material of granular form and of non-uniform density through an elongated activating chamber, maintaining said chamber under heat conditions designed for complete activation of the material in the intermediate range of density with an overactivation of material of lesser density and underactivation of material of greater density, delivering all of the activated material from the chamber, separating the granules into a plurality of classifications according to size, separating the under activated granules from the others and returning the under-activated granules into the chamber for additional activation at a location advanced in the chamber that determines an additional treatment that will cause the returned material to be brought to a degree of activation substantially equal to that of the material of intermediate range of density.

2. The method of activating primary carbon, comprising progressively advancing a charge of material of granular form and of non-uniform density through an elongated activating chamber, maintaining a circuit of hot gases through said chamber designed for complete activation of the material in the intermediate range of density with an overactivation of that of lesser density and underactivation of that of greater density, delivering all of the activated material from the chamber, separating the granules into a plurality of classifications according to size, separating the underactivated granules from the others and delivering the under-activated granules back to the activating chamber for an additional activating treatment by a circulated stream of gases extracted from the chamber heating circuit.

3. The method of activating primary carbon which comprises causing granular material of non-uniform size and non-uniform density to be fed in a continuous charge for progressive advancement through an elongated activating chamber, causing a continuous flow of hot gases within a heating circuit to flow through the chamber to effect the complete activation of the material of intermediate range of density in its travel through the chamber with an underactivation of material of greater density and overactivation of material of lesser density, delivering all of the activated material from the chamber, separating the granules into a plurality of classifications according to size, effecting the separation of granules of the various classifications by air blasts to segregate the under activated from the others, returning the under-activated granules from all classifications to the chamber at a location that determines an additional treatment that will cause the returned material to be further activated to a degree subsantially equal to that of the material of inermediae range in its first passage through the chamber.

4. A method as recited in claim 3 wherein a circuit of hot gases for activation is maintained through a heating furnace and through the chamber, and wherein the return of under activated material to the furnace is effected by a circulating stream of gases drawn from the furnace heating circuit.

WORTH C. GOSS.
OLIVER P. M. GOSS.